US011844293B2

(12) United States Patent
Cohen et al.

(10) Patent No.: US 11,844,293 B2
(45) Date of Patent: Dec. 12, 2023

(54) PHYSICAL UNCLONABLE FUNCTION DEVICE WITH PHASE CHANGE

(71) Applicant: International Business Machines Corporation, Armonk, NY (US)

(72) Inventors: Guy M. Cohen, Ossining, NY (US); Takashi Ando, Eastchester, NY (US); Nanbo Gong, White Plains, NY (US); Franco Stellari, Waldwick, NJ (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 17/492,799

(22) Filed: Oct. 4, 2021

(65) Prior Publication Data

US 2023/0108998 A1     Apr. 6, 2023

(51) Int. Cl.
*H10N 70/00*     (2023.01)
*H01L 23/00*     (2006.01)
(Continued)

(52) U.S. Cl.
CPC ......... *H10N 70/841* (2023.02); *H01L 23/576* (2013.01); *H03K 19/003* (2013.01);
(Continued)

(58) Field of Classification Search
CPC .... H10N 70/841; H10N 70/231; H10N 70/24; H01L 23/576; H03K 19/003; H04L 9/3278
See application file for complete search history.

(56) References Cited

U.S. PATENT DOCUMENTS 6,815,744 B1 *  11/2004  Beck ............... H10N 70/826
                                                       257/295
8,861,736 B2   10/2014  BrightSky et al.
(Continued)

OTHER PUBLICATIONS

Challa, Rohith Prasad, "SR Flip-Flop Based Physically Unclonable Function (PUF) for Hardware Security", University of South Florida, Scholar Commons, Jun. 2018, pp. 1-46.
(Continued)

*Primary Examiner* — Daniel D Chang
(74) *Attorney, Agent, or Firm* — Scully, Scott, Murphy & Presser, PC; Daniel P. Morris, Esq.

(57) ABSTRACT

A physical unclonable function device includes alternating regions of programable material and electrically conductive regions. The regions of programable material are configured to switch resistance upon receiving an electric pulse. An electric pulse applied between two outer electrically conductive regions of the alternating regions will switch the resistance of at least one region of programmable material. The alternating regions may include a plurality of the electrically conducting regions and a region of the programable material disposed between each of the plurality of electrically conductive regions. The resistance of each of the regions of programable material is selectively variable in at least a portion thereof as a result of the electric pulse flowing therethrough. The resistance value of the programable material region may be a readable value as a state of the device. The regions of programmable material may be formed of a phase change material or an oxide.

18 Claims, 7 Drawing Sheets

(51) Int. Cl.
    *H04L 9/32*     (2006.01)
    *H03K 19/003*     (2006.01)
    *H10N 70/20*     (2023.01)

(52) U.S. Cl.
    CPC .......... *H04L 9/3278* (2013.01); *H10N 70/231* (2023.02); *H10N 70/24* (2023.02)

(56) References Cited

U.S. PATENT DOCUMENTS

| | | | |
|---|---|---|---|
| 8,971,527 | B2 | 3/2015 | Brightsky et al. |
| 9,811,689 | B1 | 11/2017 | Tseng et al. |
| 11,081,172 | B1 | 8/2021 | Cheng et al. |
| 2004/0161888 | A1* | 8/2004 | Rinerson .............. G11C 13/003 438/210 |
| 2010/0051227 | A1 | 3/2010 | Anbudurai |
| 2011/0069528 | A1* | 3/2011 | Gammel ............ G11C 13/0069 326/8 |
| 2012/0007031 | A1 | 1/2012 | Mathew et al. |
| 2013/0155766 | A1 | 6/2013 | Liu |

OTHER PUBLICATIONS

Choi, et al., "Multibit-Generating Pulsewidth-Based Memristive-PUF Structure and Circuit Implementation", E2020, pp. Electronics, MDPI, Sep. 4, 2020, pp. 1-14.

Kavehei, et al., "mrPUF: A Memristive Device based Physical Unclonable Function", Conference: 13th International Conference on Applied Cryptography and Network Security at: New York vol. 9092Feb. 2013, pp. 1-4.

Zhang et al., "Design and security evaluation of PCM-based rPUF using cyclic refreshing strategy", Electronics Express, IEICE Electronics Express, Apr. 20, 2018, pp. 1-9, vol. 15, No. 10.

Del Valle et al., "Challenges in materials and devices for resistive swithing-based neuromorphic computing", Journal of Applied Physics 124, Dec. 2018, pp. 1-23.

McGrath, et al., "A PUF taxonomy", Applied Physics Reviews, Rev. 6, Feb. 12, 2019, pp. 1-26, https://doi.org/10.1063/1.5079407.

* cited by examiner

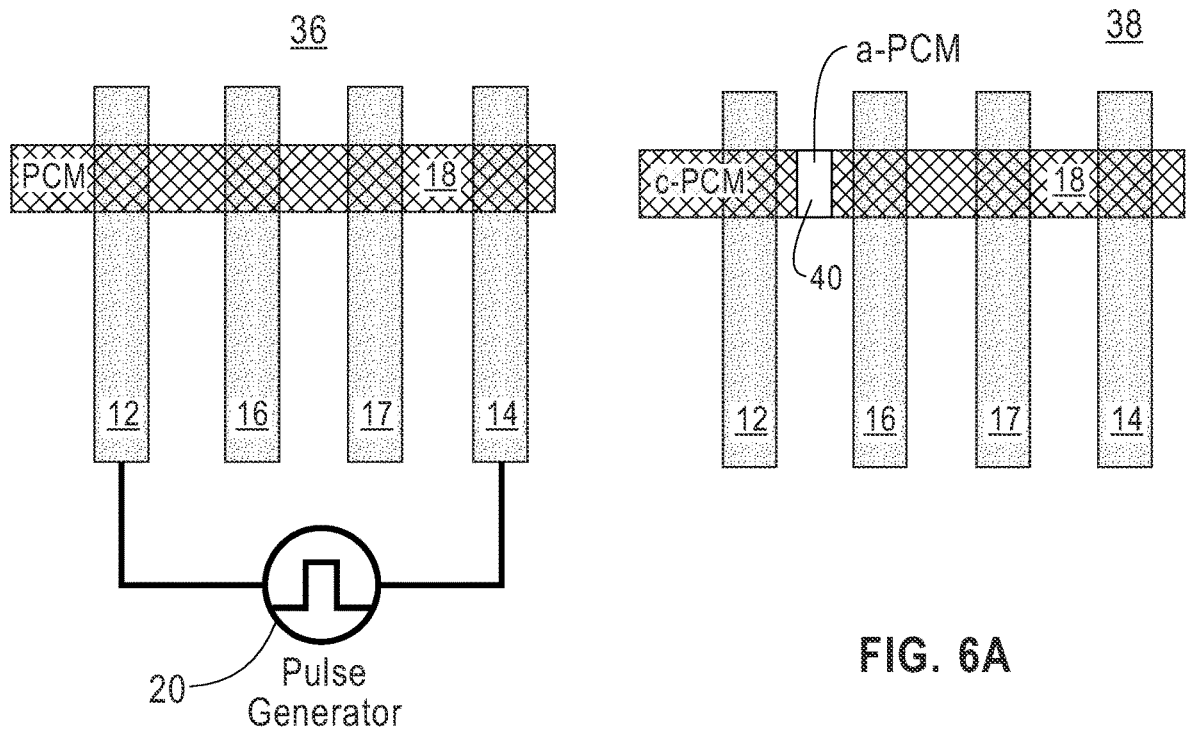
FIG. 5
FIG. 6A
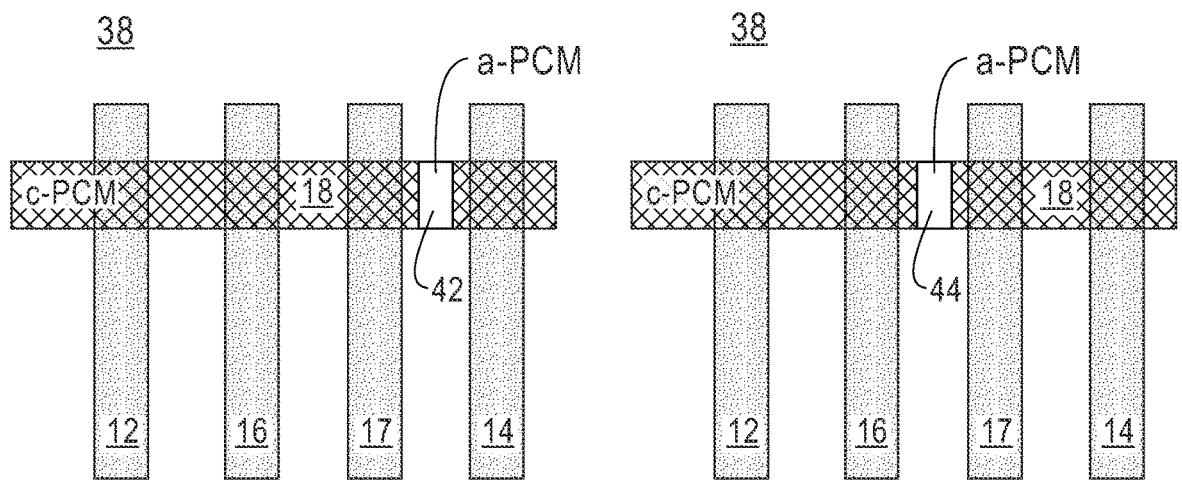
FIG. 6B
FIG. 6C

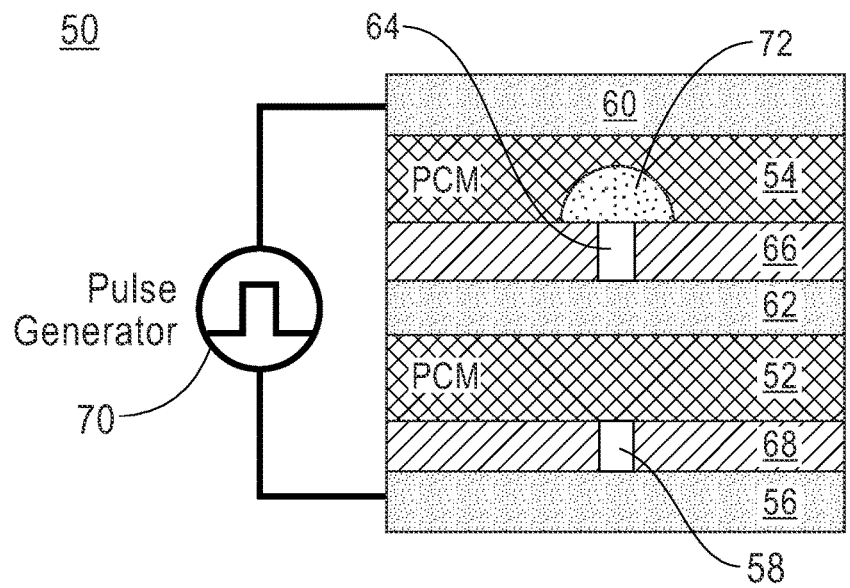

FIG. 7

```
┌─────────────────────────────────────────────────────┐
│ Electrically coupling a plurality of spaced contacts to │
│         a phase change material (PCM) structure       │
│                         S10                           │
└─────────────────────────────────────────────────────┘
                          ↓
┌─────────────────────────────────────────────────────┐
│   Applying a reset pulse between two outer contacts of the │
│  spaced contacts to randomly form an amorphous region in │
│    the PCM structure between an adjacent pair of contacts │
│                         S12                           │
└─────────────────────────────────────────────────────┘
                          ↓
┌─────────────────────────────────────────────────────┐
│    Measuring resistance between each pair of the adjacent │
│                   pairs of contacts                    │
│                         S14                           │
└─────────────────────────────────────────────────────┘
                          ↓
┌─────────────────────────────────────────────────────┐
│  Generating a logic 1 or 0 based on the resistance measurements │
│                         S16                           │
└─────────────────────────────────────────────────────┘
```

FIG. 8

PHYSICAL UNCLONABLE FUNCTION DEVICE WITH PHASE CHANGE

BACKGROUND

This disclosure is directed to physical unclonable function devices and more particularly to devices and methods of forming physical unclonable function devices with phase change material.

A physical unclonable function (PUF) creates a unique, random key for a physical entity such as an integrated circuit. A PUF comprises a set of unique analog values from structures and materials that can be measured on chip (e.g., by a measurement circuit) followed by conversion to a code, or key, in binary form. PUFs have been used for key creation in applications with high security requirements, such as mobile and embedded devices. A PUF device stores the secret codes used for authentication and key generation.

A phase-change material (PCM) can be used to form nonvolatile memory devices in which data can be stored or erased by heating or cooling a phase-change layer therein. For example, a device having a unique physical unclonable function may include an integrated circuit including a phase change memory as an embedded non-volatile memory. Metal oxide cells may also be used to form a PUF device. However, previous PUF implementations relied on unstable conduction threshold that is sensitive to temperature variations and could drift over time.

SUMMARY

In one embodiment a physical unclonable function device includes alternating regions of programable material and electrically conductive regions, the regions of programable material being configured to switch resistance upon receiving an electric pulse. An electric pulse applied between two outer electrically conductive regions of the alternating regions will switch the resistance of at least one region of programmable material. In one embodiment, the alternating regions of programable material and electrically conductive regions include a plurality of the electrically conducting regions and a region of the programable material disposed between each of the plurality of electrically conductive regions. The resistance of each of the regions of programable material is selectively variable in at least a portion thereof as a result of the electric pulse flowing therethrough. In one embodiment, the resistance value in each of the programable material regions is a readable value as a state of the device. The regions of programmable material may be formed of a phase change material or an oxide.

In one embodiment, a PUF device includes a phase change material (PCM) structure, and a plurality of spaced contacts electrically coupled to the PCM structure. A reset pulse applied between two outer contacts of the plurality of spaced contacts will form an amorphous region in the PCM structure between an adjacent pair of the plurality of spaced contacts. In one embodiment, the plurality of spaced contacts includes at least two adjacent pairs of contacts, and the amorphous region will randomly form between one of the at least two adjacent pairs of contacts. In some embodiments, the PUF device includes a measuring circuit for measuring resistance between each pair of the at least two adjacent pairs of contacts. In some embodiments, the measuring circuit generates a logic 1 or 0 based on the resistance measurements. In some embodiments, the measuring circuit generates a logic 1 or 0 based on which pair of adjacent contacts has a higher resistance. In some embodiments, the PCM structure is formed as a bar structure. A PUF device may also be formed by a plurality of spaced contact layers and a plurality of spaced PCM layers interposed between the spaced contact layers, with the spaced contact layers being electrically coupled through the spaced PCM layers. A reset pulse applied between two outer contact layers of the spaced contact layers will randomly form an amorphous region in one of the PCM layers.

In one embodiment, a method of forming a PUF device includes alternating regions of programable material and electrically conductive regions, the regions of programable material being configured to switch resistance upon receiving an electric pulse and applying an electric pulse between two outer electrically conductive regions of the alternating regions to switch the resistance of at least one region of programmable material. In one embodiment, the method includes electrically coupling a plurality of spaced contacts to a phase change material (PCM) structure and applying a reset pulse between two outer contacts of the plurality of spaced contacts to form an amorphous region in the PCM structure between an adjacent pair of the plurality of spaced contacts.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 5 is a schematic diagram of one embodiment of the PUF device including a bar PCM disclosed in this specification.

FIG. 6A is a schematic diagram of one embodiment of the PUF device including a bar PCM disclosed in this specification.

FIG. 6B is a schematic diagram of one embodiment of the PUF device including a bar PCM disclosed in this specification.

FIG. 6C is a schematic diagram of one embodiment of the PUF device including a bar PCM disclosed in this specification.

FIG. 7 is a schematic diagram of one embodiment of the PUF device including a multiple layer PCM disclosed in this specification.

FIG. 8 is a flow diagram of one embodiment of the method disclosed in this specification.

DETAILED DESCRIPTION

Embodiments according to the present disclosure provide devices and methods for physical unclonable function devices employing phase change material structures. The resistance values of the PCM, which can be set at different stages between fully amorphous (i.e., high resistance) and fully crystalline (i.e., low resistance), collectively represent a physical unclonable function. As such, physical properties of the phase change material can then be measured to derive a signature (e.g., by way of one or more analog response measurements), from which a binary key can be further derived. One of the principles behind a PUF is that the cryptographic key(s) are not stored in binary form when the chip is powered down but are hidden in the form of unique physical analog identifiers within the hardware so that the code can only be executed on a designated authorized uncompromised IC. Thus, when a circuit is turned on, the structures comprising the PUF can be measured, and the analog values converted into a binary code (or key) using an on chip measurement circuit. However, if the chip is turned off, the binary code is not stored in any memory, but is implicit in the properties of the chip.

In one embodiment, a PUF device includes a phase change material PCM structure, and a plurality of spaced contacts electrically coupled to the PCM structure. A reset pulse applied between two outer contacts of the plurality of spaced contacts will form an amorphous region in the PCM structure between an adjacent pair of the plurality of spaced contacts. In one embodiment, the plurality of spaced contacts includes at least two adjacent pairs of contacts, and the amorphous region will randomly form between one of the at least two adjacent pairs of contacts. In some embodiments, the PUF device includes a measuring circuit for measuring resistance between each pair of the at least two adjacent pairs of contacts. In some embodiments, the measuring circuit generates a logic 1 or 0 based on the resistance measurements. In some embodiments, the measuring circuit generates a logic 1 or 0 based on which pair of adjacent contacts has a higher resistance. In some embodiments, the PCM structure is formed as a bar structure.

Figure 1:
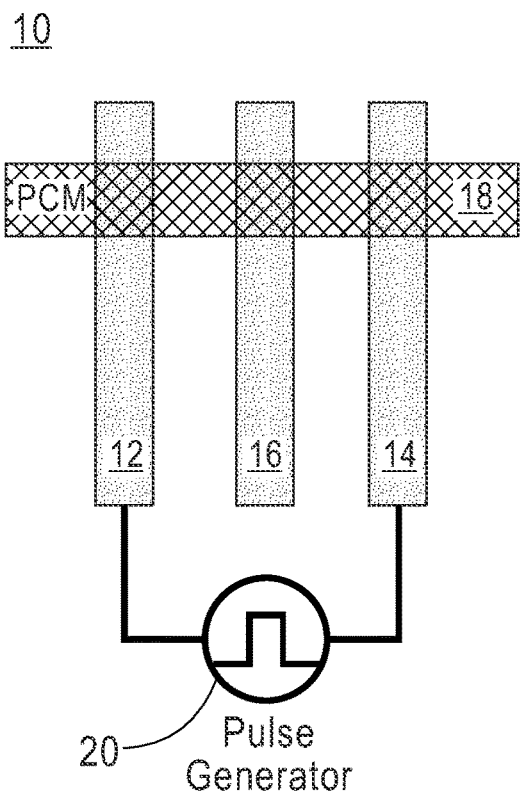
FIG. 1 is a schematic diagram of one embodiment of the PUF device including a bar PCM disclosed in this specification.
Figure 2A:
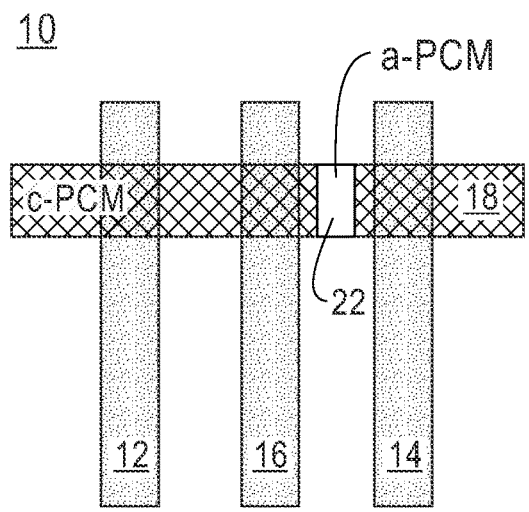
FIG. 2A is a schematic diagram of one embodiment of the PUF device including a bar PCM disclosed in this specification.
Figure 2B:
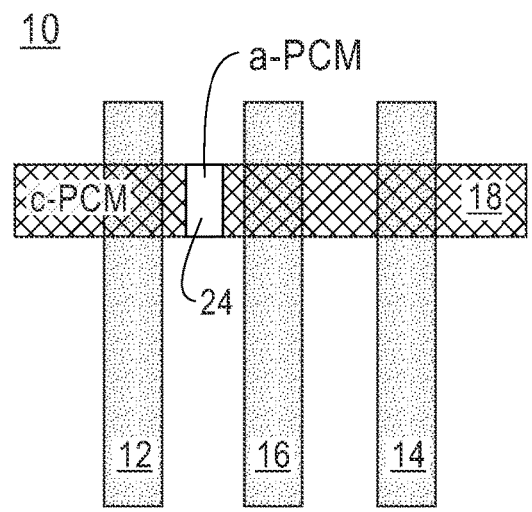
FIG. 2B is a schematic diagram of one embodiment of the PUF device including a bar PCM disclosed in this specification.

In one embodiment, as shown in FIG. 1, the PUF device 10 includes three spaced contacts 12, 14 and 16 in contact with a PCM bar structure 18. In one embodiment, the contacts 12, 14 and 16 are equally spaced. A pulse generator 20 applies a reset pulse between the two outer contacts 12 and 14. The reset pulse will cause an amorphous PCM region to randomly form between the center contact 16 and one of the two outer contacts 12 and 14. The location of the amorphous region depends on the crystalline PCM local changes in thermal conductance as well as due to fabrication imperfections. It is therefore unclonable and will be different for each device. As shown in FIG. 2A, in one embodiment, PCM 18 is in a crystalline form with the location of amorphous region 22 being formed between outer contact 14 and central contact 16. In FIG. 2B, PCM 18 is in a crystalline form with the location of amorphous region 24 being formed between outer contact 12 and central contact 16.

A reset pulse is typically a current pulse that deposits enough energy in the PCM material so locally the temperature exceeds the melting temperature of the PCM. Equally important is that the pulse trailing edge will be as short as possible so cooling from the melt will be fast, not allowing the PCM material to crystallize. The reset pulse is also referred to as a melt-quench process. The pulse duration depends on the PCM material and the device structure. $Ge_2Sb_2Te_5$ is one of the most commonly used PCM material. Other materials are also useful: $Sb_2Te_3$, GeTe, $Ga_xSb_{1-x}$, etc. There are many other materials that may serve as the PCM structure in the present disclosure. For $Ge_2Sb_2Te_5$ a typical reset pulse has a duration of 50 to 100 ns, and a falling edge (trailing edge) of 5 ns. A set pulse, which function is to crystalize the PCM, does not need to melt the material. It needs to provide enough energy such that the PCM material will reach a temperature above the crystallization temperature. As an example, for $Ge_2Sb_2Te_5$ the crystallization temperature is about 165° C. The melting temperature is about 600° C. It is also possible to have a set pulse that will melt the material providing that the trailing edge will be long so the PCM will cool slowly to reach a crystalline phase. Set pulses usually use much less current than reset pulses.

Phase change materials, such as chalcogenides, can be caused to change phase between an amorphous state and a crystalline state by application of electrical current at levels suitable for implementation in integrated circuits. The generally amorphous state is characterized by higher resistivity than the generally crystalline state, which can be readily sensed to indicate data.

Phase change materials are capable of being switched between a first structural state in which the material is in a generally amorphous solid phase, and a second structural state in which the material is in a generally crystalline solid phase. The term "crystalline" is used to refer to a relatively more ordered structure, more ordered than in an amorphous structure, which has detectable characteristics such as lower electrical resistivity than the amorphous phase. Other material characteristics affected by the change between amorphous and crystalline phases include atomic order, atomic density, free electron concentration, optical refractive index, optical absorption and activation energy. The material can be switched into either different solid phases or mixtures of two or more solid phases, providing a gray scale between completely amorphous and completely crystalline states.

The change from the amorphous to the crystalline state is generally a lower current operation, requiring a current that is sufficient to raise the phase change material to a level between a phase transition temperature and a melting temperature. The change from crystalline to amorphous, caused by the reset pulse, is generally a higher current operation, which includes a short high current density pulse to melt or break down the crystalline structure, after which the phase change material cools quickly, quenching the phase change process, thus allowing at least a portion of the phase change structure to stabilize in the amorphous state.

Figure 3:
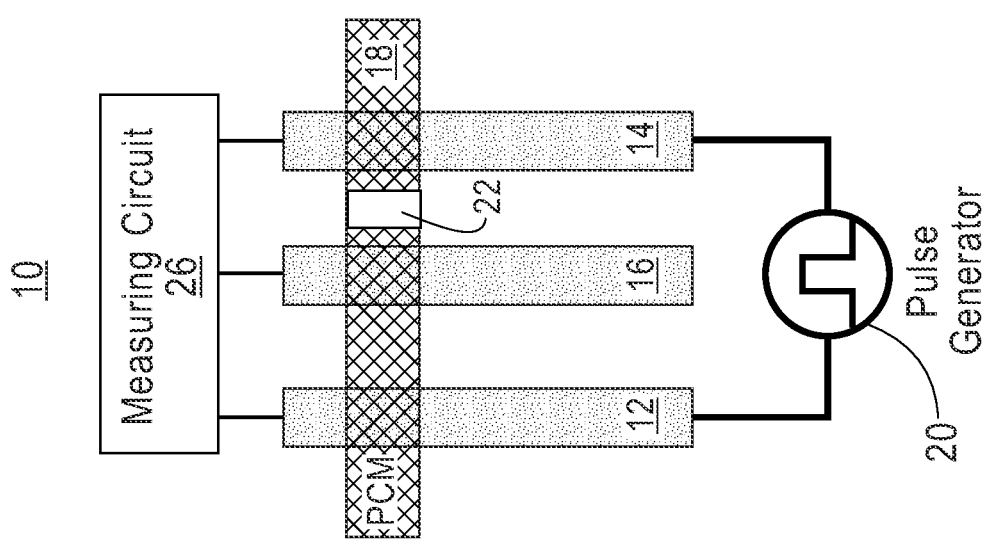
FIG. 3 is a schematic diagram of one embodiment of the PUF device including a bar PCM disclosed in this specification.

After the reset pulse is applied, the resistance between contacts 12 to 16 and the resistance between contacts 14 and 16 is measured by a measuring circuit 26 as shown in FIG. 3. In one embodiment, the measuring circuit 26 measures one or more PUF devices 10 and the response(s) of the PUF devices 10 representing the physical unclonable function is used by the measuring circuit 26 to convert the PUF values(s) into a voltage value, or values. The measuring circuit 26 converts the signal that is influenced by the PUF value into a digital value, or binary representation to generate a logical 1 or 0. For example, in one embodiment, the measuring circuit 26 can generate a logical "1" when the amorphous PCM region 24 is formed between contacts 12 and 16 as shown in FIG. 2B and the measuring circuit 26 can generate a logical "0" when the amorphous PCM region 22 is formed between contacts 14 and 16 as shown in FIG. 2A. In one embodiment, this process is repeated over one or more PUF devices being measured in order to create a binary set. According to various embodiments, this binary set (also referred to herein as a code, or key), is used as a cryptographic key to authenticate a device. Notably, the code is never stored in binary form on the measurement circuit. It should also be noted that although a binary based key is described, the present disclosure is not so limited. Namely, other, further, and different embodiments may be incorporated in a ternary based system, and the like.

Other measurement circuits that are designed specifically for use with phase change material may also be used. In one embodiment, the measurement circuit 26 may comprise an on-chip measurement circuit (i.e., located within the integrated circuit itself, such as on a die of the integrated circuit) that is configured to measure a resistance response, a capacitance response, a voltage response, or the like of one or more PUF devices (i.e., structures" or regions—in this case, phase change material whose regions have been set to exhibit varying degrees of crystallinity) comprising a physical unclonable function. The measurement circuit may further include a voltage controlled ring oscillator type measurement circuit as another possible way of measuring the PUF devices disclosed herein There are several reasons for an amorphous region to form in just one region between contacts 12 and 16 or between contacts 14 and 16. One is the PCM bar 18 will typically have line width variations. These variations are a result of the patterning process that is used to make the bar pattern. For example, in one embodiment, a PCM layer is blanket deposited over contacts 12, 14, and 16. A photoresist layer is spin-coated over the PCM layer. Using optical lithography, a bar shape is exposed into the photoresist and the remainder of the resist is developed (dissolved away). A reactive ion etching (RIE) is then used to etch the PCM material except where it is protected by the photoresist. The resist that was used as a mask is then removed. The exposure and development of the photoresist create a photoresist bar that is not perfect. It has a line edge roughness (LER) and a line width roughness (LWR). This LER and LWR will be replicated in the etched PCM bar. The RIE process has some stochasticity as well and that would add to the LER and LWR. The result is a PCM bar that is not uniform in width. There is always going to be one location along the bar with a minimum width. That minimum width location may be between contacts 12 and 16 or 14 and 16. This location will vary in each device. When applying a current pulse between the outer contacts 12 and 14, the amorphous region will form at the location with the highest current density. That location will be where the PCM bar has the narrowest width.

Another reason is the PCM material at the crystalline phase is comprised of many small single-crystal regions. This type of material is also known as polycrystalline material. The crystals in the regions are of different size and different orientation and follow some distribution of sizes. When patterning the film into a bar, the number of crystal regions and their sizes between contacts 12 and 16 will be different than the number of crystals regions between contacts 14 and 16. This is due to the random nature of the polycrystalline PCM. This difference may be more significant for smaller bar sizes (for example, when the PCM bar width is comparable to the average grain size). The resistance of the PCM material depends on the crystal regions sizes. The smaller the grain size (crystal region size) the higher the resistance. This is due to scattering electrons experience at grain boundaries. As such due to the variability in polycrystalline materials, the resistance between contacts 12 and 16 and contacts 14 and 16 will always be different and that difference will become more significant for small bar widths. When a current pulse of amplitude I is flowing between contacts 12 and 14, the power dissipation between contacts 12 to 16 will be $I^2 \times R_{12-16}$ where $R_{12-16}$ is the resistance of the PCM bar between contacts 12-16. Similarly, the power dissipation between contacts 16 and 14 will be $I^2 \times R_{16-14}$ where $R_{16-14}$ is the resistance of the PCM bar between contacts 16 and 14. Since $R_{12-16}$ and $R_{16-14}$ are different due to the stochastic nature of polycrystalline materials, more power will be deposited in the segments 12-16 or 16-14 with the higher resistance and this is where the amorphous material will form. Moreover, if after amorphization, the PCM material is re-crystallized, the size of the grains and their number in the re-crystallized PCM region is going to be random. Applying another reset pulse (a pulse which leads to formation of an amorphous region) between contacts 12-14 may not necessarily lead to an amorphous region between the same contacts as the previous pulse. In that respect the PUF function can be used many times.

Another reason may be that contacts 12, 14 and 16 are also suffering from fabrication imperfections. Depending on how these contacts were made, it is possible that the gap between contact 12-16 will be slightly different than the gap between contact 14 and 16. As explained before this could result from LER or LWR or other imperfections in the fabrication. Contacts 12, 14 and 16 serve also as heat sinks since metals are usually better heat conductors than the surrounding dielectric material. Assuming a perfect PCM bar (no width variations) then when applying a current pulse between contacts 12 and 14, the hottest spots will form at equal distance, which is the center point between contacts 12-16 and 14-16. It should be noted that thermoelectrical effect can lead to a shift from the center, but this is a secondary effect. However, if the spacing between the contacts 12-16 and 14-16 is not equal due to fabrication imperfections, then the center point for the pair of contacts with the larger spacing will have less cooling and reach a higher temperature at given current than the pair with the smaller gap. The amorphous region will form between the pair of contacts with the larger gap.

In addition, as explained above, the PCM material is polycrystalline. There is a distribution of crystals sizes (known as grains). The material can be considered homogeneous on a scale of many grains, but when considering a local region (small volume with few grains), the material properties are heterogeneous due to variation in the grain sizes and their orientation. Much like electrical conductance, the thermal conductance is strongly dependent on the structure of the PCM material. Smaller grain size typically leads to lower thermal conductance. The PCM device is a thermoelectrical device. The heating of the PCM material depends on the electrical current, but also the heat transport (which include cooling). So even if the resistance between contacts 12 and 16 and 14 and 16 would have been equal, if the local thermal properties are different then a hotter region will form in the region with the lower thermal conductance. Since heat is mostly conducted out of the device via contacts 12, 14 and 16, variations in these contacts will also add to the thermal variability.

While it is very unlikely that two amorphous regions will form, this may occur for very long reset pulses. But even if occurs there will be a larger amorphous region, which is the region that forms first. The amorphous PCM material has a much larger resistance than crystalline PCM material (this is true for most PCM materials such as $Ge_2Sb_2Te_5$. There are some exceptions like $Cr_2Ge_2Te_6$ where the amorphous material is more conductive). The longer the segment of amorphous PCM material that forms the higher the total resistance. The resistance of a PCM bar is $R=\rho \times L/A$, where $\rho$ is the material resistivity, L is the length of the bar, and A is the cross-sectional area perpendicular to the current flow. For most PCM materials the resistivity of amorphous material ($\rho_A$) is much larger than the resistivity of crystalline material ($\rho_C$). Using the above expression for resistance it is easy to see that the longer the amorphous region is the larger the resistance will be ($L_A$ will be longer).

Figure 4:
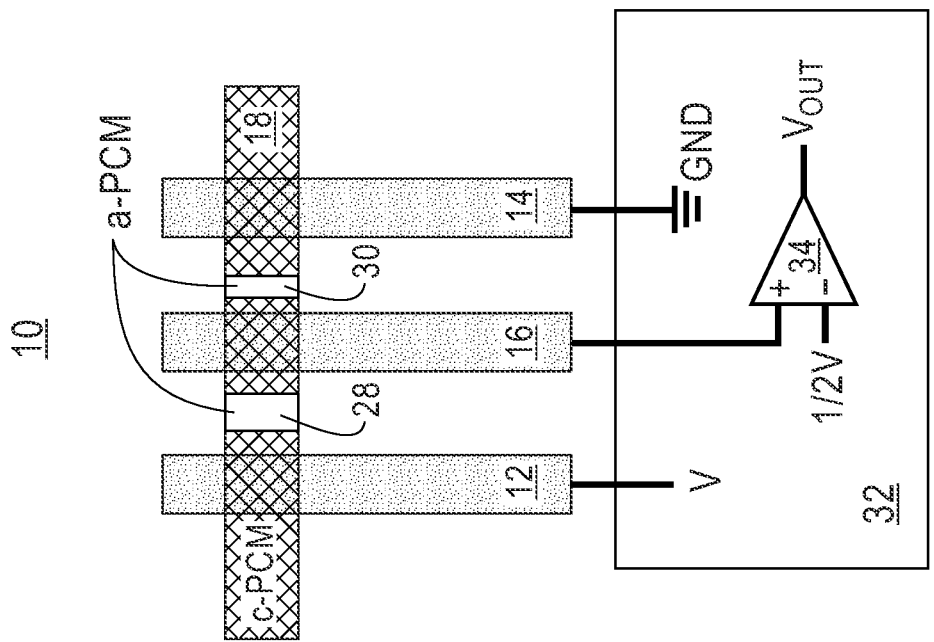
FIG. 4 is a schematic diagram of one embodiment of the PUF device including a bar PCM disclosed in this specification.

While unlikely to occur, if post the reset, two amorphous PCM regions 28 and 30 are formed as shown in FIG. 4, the PUF device will still work since it is near impossible that both regions would have the same resistance. The measuring circuit 32 measures the resistance between contacts 12 and 16 and between 14 and 16. The measuring circuit 32 can generate a logical 1 if resistance between 14 and 16 is larger and a "0" if resistance is smaller. In one embodiment, as shown in FIG. 4, the measuring circuit 32 includes an operation amplifier 34 that will output a logical 0 if $R_{12-16}>R_{14-16}$ and will output a logical 1 if $R_{12-16}<R_{14-16}$.

In some embodiments, the PUF device can be extended to include more segments of amorphous PCM regions separated by contacts, thus obtaining a multi-bit PUF. As shown in FIG. 5, PUF device 36 includes PCM bar 18 with contacts 12, 14, 16 and 17 and the pulse generator 20 applying a reset pulse to contact 12 and 14. For example, as shown in FIG. 6A PUF device 38 can form an amorphous region 40 between contacts 12 and 16 and the measuring circuit (not shown) can generate a logical 1, 0. As shown in FIG. 6B PUF device 38 can form an amorphous region 42 between contacts 14 and 17 and the measuring circuit (not shown) can generate a logical 0, 1. As shown in FIG. 6C PUF device 38 can form an amorphous region 44 between contacts 16 and 17 and the measuring circuit (not shown) can generate a logical 1, 1.

In some embodiments, a PUF device is formed by a plurality of spaced contact layers and a plurality of spaced PCM layers interposed between the plurality of spaced contact layers, with the plurality of spaced contact layers being electrically coupled through the plurality of spaced PCM layers. A reset pulse applied between two outer contact layers of the plurality of spaced contact layers will form an amorphous region in one of the plurality of PCM layers. In some embodiments, the plurality of spaced contact layers includes at least two pairs of contact layers, with each pair of contact layers being separated by one of the plurality of PCM layers. The amorphous region will randomly form in the PCM layer between one of the at least two pairs of contact layers. The PUF device includes a measuring circuit for measuring resistance between each pair of the at least two pairs of contact layers. In some embodiments, the measuring circuit generates a logic 1 or 0 based on the resistance measurements. In some embodiments, the measuring circuit generates a logic 1 or 0 based on which pair of adjacent contact layers has a higher resistance.

Referring now to FIG. 7, the heater contacts 58 and 64 are a metal that confines the current such that the current density (A/cm$^2$) is the largest at the PCM/heater junction. Because the current density is the largest at the junction, melting of the PCM will start there if the current is high enough (as in a reset pulse). The heater is typically chosen to be a metal like TiN that would not react with the PCM material at high temperatures.

In some embodiments, the amorphous region, such as region 72 will form only in one of the two PCM layers 52 and 54. This type of structure of PCM device is typically referred to as a dome or mushroom PCM device due to the shape of the amorphous dome and the heater underneath. The primary reason that only one amorphous region will form in the PUF device 50 shown in FIG. 7 is that the heater size which defines the current density (smaller heater diameter leads to larger current density) will vary between different devices. The definition of the heater will suffer from similar variabilities discussed above with respect to the bar structure 18. The variabilities in the lithography and RIE processes that are used to define the heater will effectively yield slightly different heater diameters and hence different current densities at the heater PCM junction. Another factor that would add to variability in this structure is the PCM/heater interface resistance. The top surface of the heater is typically cleaned by various methods (such as argon (Ar) sputtering) before deposition of the PCM material, and the nature of the cleaning process is stochastic. This leads to variations in the contact resistance at the PCM/heater junction. The contact resistance may lead to additional power dissipation at the junction and therefore higher temperatures and more efficient melting. The contact resistance may be less of a variation source for the PCM bar structure 18 since the contact size (area) there does not need to be small. The current confinement in the PCM bar structure 18 is defined by the PCM bar cross-section, and not by the contact size as in the case of the dome region of PUF device 50. The measuring circuit (not shown) for measuring the resistance between contact layers 56 and 62 and between contact layers 60 and 62 may be the same as described above in connection with the PCM bar structure 18.

In one embodiment, as shown in FIG. 7, the PUF device 50 includes a first PCM layer 52 and a second PCM layer 54. The PUF device includes a first outer contact layer 56 electrically coupled to the first PCM layer 52 through a first heater contact 58 and a second outer contact layer 60 electrically coupled to the second PCM layer 54. A central contact layer 62 is electrically coupled to the first PCM layer 52 and is electrically coupled to the second PCM layer 54 through a second heater contact 64. A first dielectric layer 66 separates PCM layer 54 and contact layer 62 and second dielectric layer 68 separates PCM layer 52 and contact layer 56. A reset pulse applied by pulse generator 70 between the two outer contact layers 56 and 60 will randomly form an amorphous region in one of the plurality of PCM layers. In the example shown in FIG. 7, the amorphous region randomly forms as a dome region 72 in PCM layer 54.

FIG. 8 is one embodiment of a method of forming a physical unclonable function device. The method includes step S10 of electrically coupling a plurality of spaced contacts to a phase change material (PCM) structure and step S12 of applying a reset pulse between two outer contacts of the plurality of spaced contacts to form an amorphous region in the PCM structure between an adjacent pair of the plurality of spaced contacts. In one embodiment the plurality of spaced contacts includes at least two adjacent pairs of contacts and in step S12, the amorphous region will randomly form between one of the at least two adjacent pairs of contacts. The method further includes step S14 of measuring resistance between each pair of the at least two adjacent pairs of contacts. In one embodiment, the method further includes step S16 of generating a logic 1 or 0 based on the resistance measurements. In one embodiment, step S16 includes generating a logic 1 or 0 based on which pair of adjacent contacts has a higher resistance.

Figure 9:
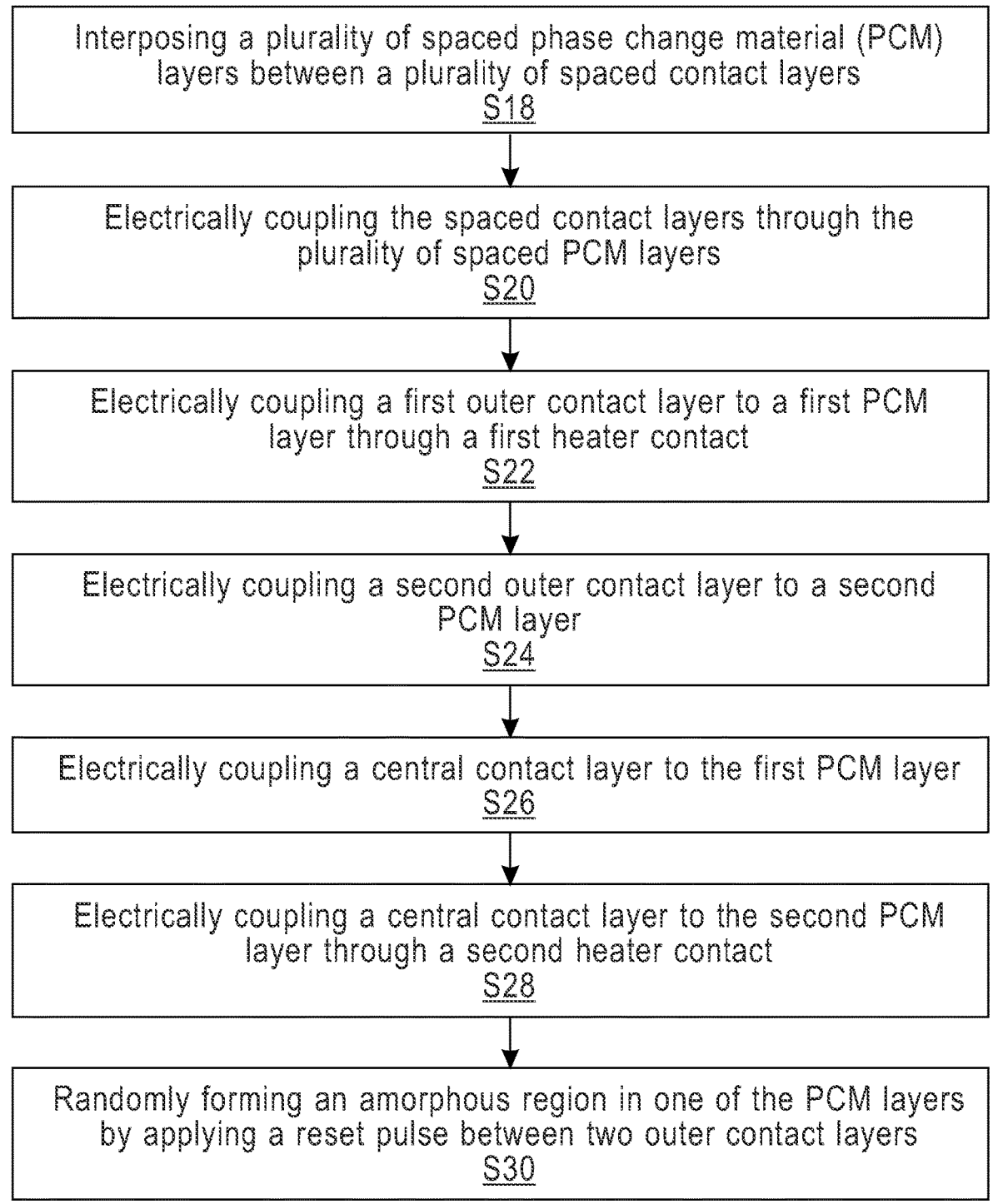
FIG. 9 is a flow diagram of one embodiment of the method disclosed in this specification.

In one embodiment, as shown in FIG. 9, the method includes step S18 of interposing a plurality of spaced phase change material (PCM) layers between a plurality of spaced contact layers and step S20 of electrically coupling the plurality of spaced contact layers through the plurality of spaced PCM layers. In one embodiment, the method includes step S22 of electrically coupling a first outer contact layer to a first PCM layer through a first heater contact, step S24 of electrically coupling a second outer contact layer to a second PCM layer, step S26 of electrically coupling a central contact layer to the first PCM layer and step S28 of electrically coupling the central contact layer to the second PCM layer through a second heater contact. The method further includes step S30 of randomly forming an amorphous region in one of the plurality of PCM layers by applying a reset pulse between two outer contact layers of the plurality of spaced contact layers. In one embodiment, the amorphous region randomly forms as a dome region in one of the first PCM layer and second PCM layer.

Figure 10A:
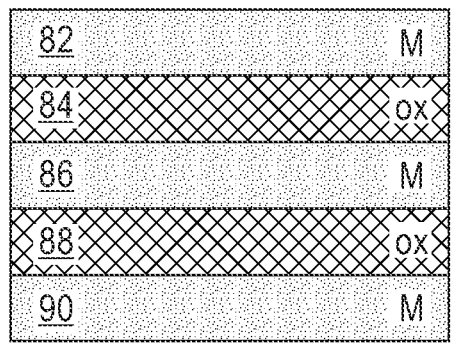
FIG. 10A is a schematic diagram of one embodiment of the PUF device having filament formation in oxides disclosed in this specification.
Figure 10B:
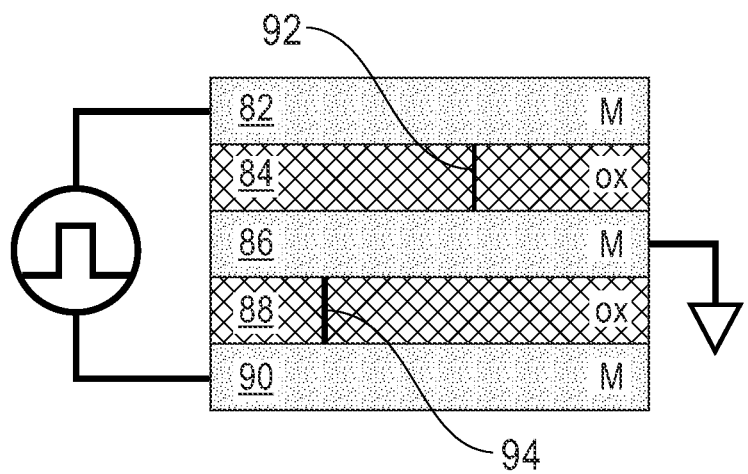
FIG. 10B is a schematic diagram of one embodiment of the PUF device having filament formation in oxides disclosed in this specification.
Figure 10C:
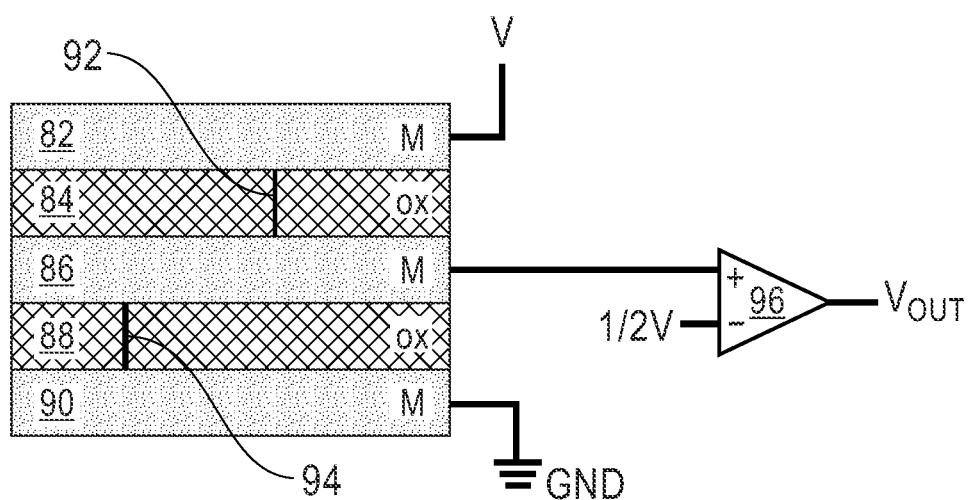
FIG. 10C is a schematic diagram of one embodiment of the PUF device having filament formation in oxides disclosed in this specification.

Referring to FIGS. 10A-10C a PUF device 80 which operation is based on the formation of conductive filaments in an oxide is described. In one embodiment, the device 80 is comprised of alternating layers of oxides and metals. As shown in the example of FIG. 10A, layers 82, 86 and 90 are conductive metallic layers that are separated by oxide layers 84 and 88. As shown in FIG. 10B, when applying a voltage pulse to the outer metallic layers 82 and 90, conductive filaments 92 and 94 may form. The nature of these filaments depends on the oxide as well as the metal.

For the PUF device 80, we consider two cases, the first where the filament is formed by localized changes to the oxide, and the second where metal is providing ions for forming the filament. In the first case, the filament is produced by electroforming migration of ions (such as oxygen vacancies) that leave behind filamentary structure of pure conductive transition metals. Examples of such oxides are $TiO_2$, $NiO$, $HfO_2$, and $Ta_2O_3$. In the second case metal ions from metallic layers 82, 86 and/or 90 "dissolve" into the oxide to form the filament. Metals such as silver (Ag) and copper (Cu) can be used to form such filaments. The first type of filamentary devices are referred to as resistive random-access memory (ReRAM or RRAM) and the second type of filamentary devices are referred to as CBRAM (Conductive Bridging RAM).

The formation of the filament is a stochastic process. As result the filaments 92 and 94 that form will have different conductance (or resistance). Another factor that will add to the variance in the filament conductance is thickness variations in oxide layers 84 and 88. These variations are a result of the layer deposited in tandem (no two depositions will result in exactly the same films), and roughness in the film thickness. The location and conductance strength of the filament depends on the magnitude of the electric field, and the maximum electric field will be at the location where the oxide is thinnest.

Referring to FIG. 10C a circuitry based on an operational amplifier 96 may be used to measure the resistances between the outer contacts 82 and 90 to the inner contact 86. Since the operational amplifier can detect even small voltage differences the output will be a logical "1" if the resistance between contacts 90 and 86 is larger than the resistance between contacts 82 and 86. The output will be a logical "0" if the resistance between contacts 90 and 86 is less than the resistance between contacts 82 and 86.

Figure 11:
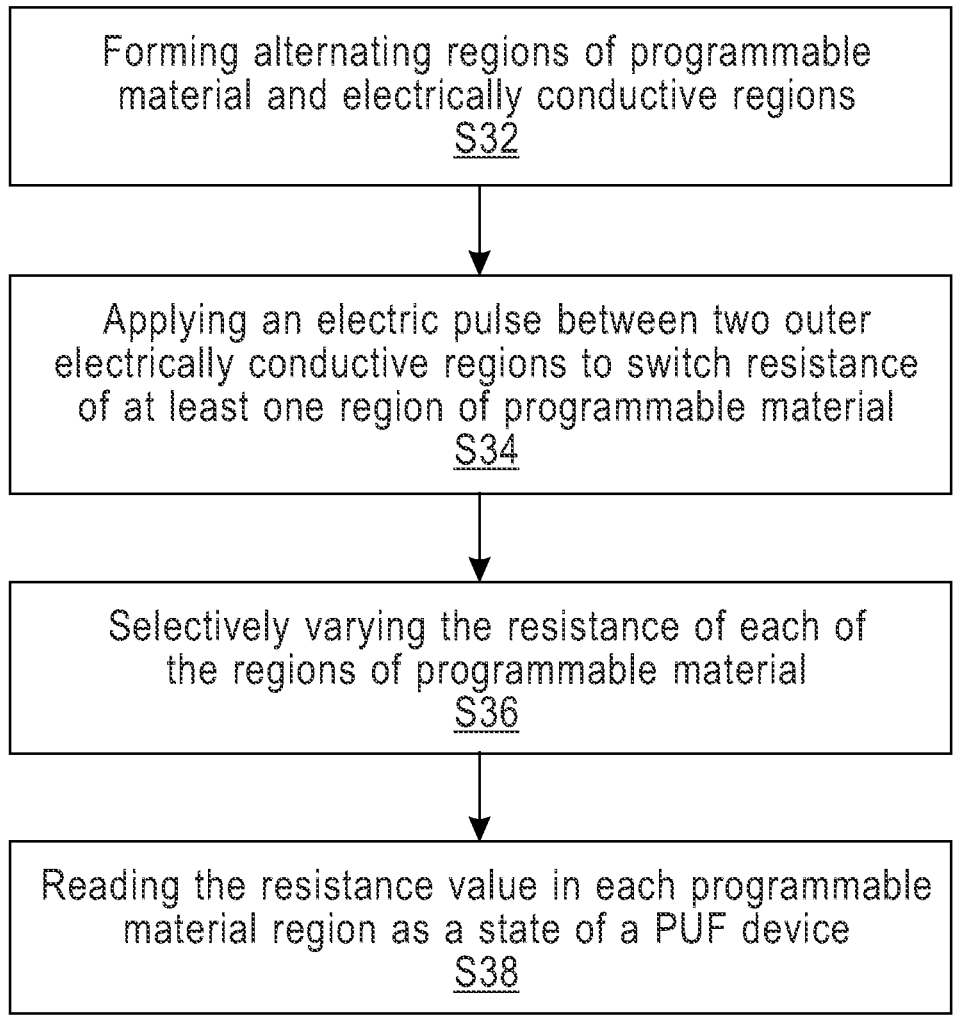
FIG. 11 is a flow diagram of one embodiment of the method disclosed in this specification.

FIG. 11 is a flow diagram of one embodiment of a method of forming a physical unclonable device that includes step S32 of forming alternating regions of programable material and electrically conductive regions, step S34 of applying an electric pulse between two outer electrically conductive regions to switch resistance of at least one region of programmable material, step S36 of selectively varying the resistance of each of the regions of programable material and step S38 of reading the resistance value in each programable material region as a state of a PUF device. In step S32, the regions of programable material are configured to switch resistance upon receiving an electric pulse. In one embodiment, the alternating regions of programable material and electrically conductive regions include a plurality of the electrically conducting regions and a region of the programable material disposed between each of the plurality of electrically conductive regions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A physical unclonable function (PUF) device comprising:
    at least three of spaced apart electrically conductive regions and at least two regions of programable material, the at least three spaced apart electrically conductive regions forming at least two pairs comprising two outer electrodes and at least one inner electrode between the two outer electrodes, one of the least two regions of programmable material being disposed between one of the at least two pairs of electrically conductive regions, the at least two regions of programable material being configured to switch resistance upon receiving an electric pulse;
    wherein an electric pulse applied between the two outer electrically conductive regions will switch the resistance of at least one region of programmable material.

2. The PUF device of claim 1 wherein,
the resistance of each of the at least two regions of programable material being selectively variable in at least a portion thereof as a result of the electric pulse flowing therethrough; the resistance value in each of said at least two regions of programable material being a readable value as a state of said device.

3. The PUF device according to claim 2 wherein said at least two regions of programmable material comprising a material selected from the group consisting of a phase change material and an oxide.

4. The PUF device according to claim 3 wherein said oxide in said at least a portion of said at least two regions of programmable material comprises elements selected from the group consisting of filaments of oxygen vacancies and filaments formed from a material of electrically conducting regions.

5. The PUF device according to claim 3 wherein said at least three electrically conductive regions comprise a metallic contact.

6. The PUF device according to claim 3 wherein the application of the electric pulse between the two outer electrically conductive regions will randomly form an amorphous region in one of the at least two regions of programmable material.

7. The PUF device of claim 6, wherein the amorphous region randomly forms as a dome region in one of the at least two regions of programmable material.

8. A physical unclonable function (PUF) device comprising:
a phase change material (PCM) structure; and
a plurality of spaced contacts electrically coupled to the PCM structure, the plurality of spaced contacts including at least two adjacent pairs of contacts;
wherein a reset pulse applied between two outer contacts of the plurality of spaced contacts will form an amorphous region in the PCM structure between an adjacent pair of the plurality of spaced contacts and wherein the amorphous region will randomly form between one of the at least two adjacent pairs of contacts.

9. The PUF device of claim 8, further comprising a measuring circuit for measuring resistance between each pair of the at least two adjacent pairs of contacts.

10. The PUF device of claim 9, wherein the measuring circuit generates a logic 1 or 0 based on the resistance measurements.

11. The PUF device of claim 9, wherein the measuring circuit generates a logic 1 or 0 based on which pair of adjacent contacts has a higher resistance.

12. The PUF device of claim 8, wherein the PCM structure is formed as a bar structure.

13. A method of forming physical unclonable function (PUF) device comprising:
forming a plurality of pairs of the electrically conducting regions and a region of the programable material disposed between each of said plurality of pairs of electrically conductive regions thereby forming alternating regions of programable material and electrically conductive regions, the regions of programable material being configured to switch resistance upon receiving an electric pulse;
applying an electric pulse between two outer electrically conductive regions of the alternating regions to switch the resistance of at least one region of programable material; and
selectively varying the resistance of each of the regions of programable material in at least a portion thereof as a result of the electric pulse flowing therethrough, the resistance value in each of said programable material region being readable value as a state of said device.

14. The method of claim 13, wherein the alternating regions of programable material and electrically conductive regions comprises electrically coupling a plurality of spaced contacts to a phase change material (PCM) structure and applying a reset pulse between two outer contacts of the plurality of spaced contacts to form an amorphous region in the PCM structure between an adjacent pair of the plurality of spaced contacts.

15. The method of claim 14, wherein electrically coupling a plurality of spaced contacts to a phase change material (PCM) structure comprises:
interposing a plurality of spaced phase change material (PCM) layers between a plurality of spaced contact layers; and
electrically coupling the plurality of spaced contact layers being through the plurality of spaced PCM layers;
wherein the reset pulse applied between two outer contact layers of the plurality of spaced contact layers will form the amorphous region in one of the plurality of PCM layers.

16. The method of claim 15, further comprising electrically coupling a first outer contact layer to a first PCM layer through a first heater contact and electrically coupling a second outer contact layer to a second PCM layer, and electrically coupling a central contact layer to the first PCM layer and electrically coupling the central contact layer to the second PCM layer through a second heater contact, and wherein the amorphous region randomly forms as a dome region in one of the first PCM layer and second PCM layer.

17. The method of claim 14, further comprising generating a logic 1 or 0 based on the resistance measurements.

18. The method of claim 13, further comprising measuring resistance between at least two adjacent pairs of contacts.

* * * * *